J. F. O'CONNOR.
FRICTION SHOCK ABSORBING MECHANISM.
APPLICATION FILED MAR. 12, 1918.
1,302,074.
Patented Apr. 29, 1919.
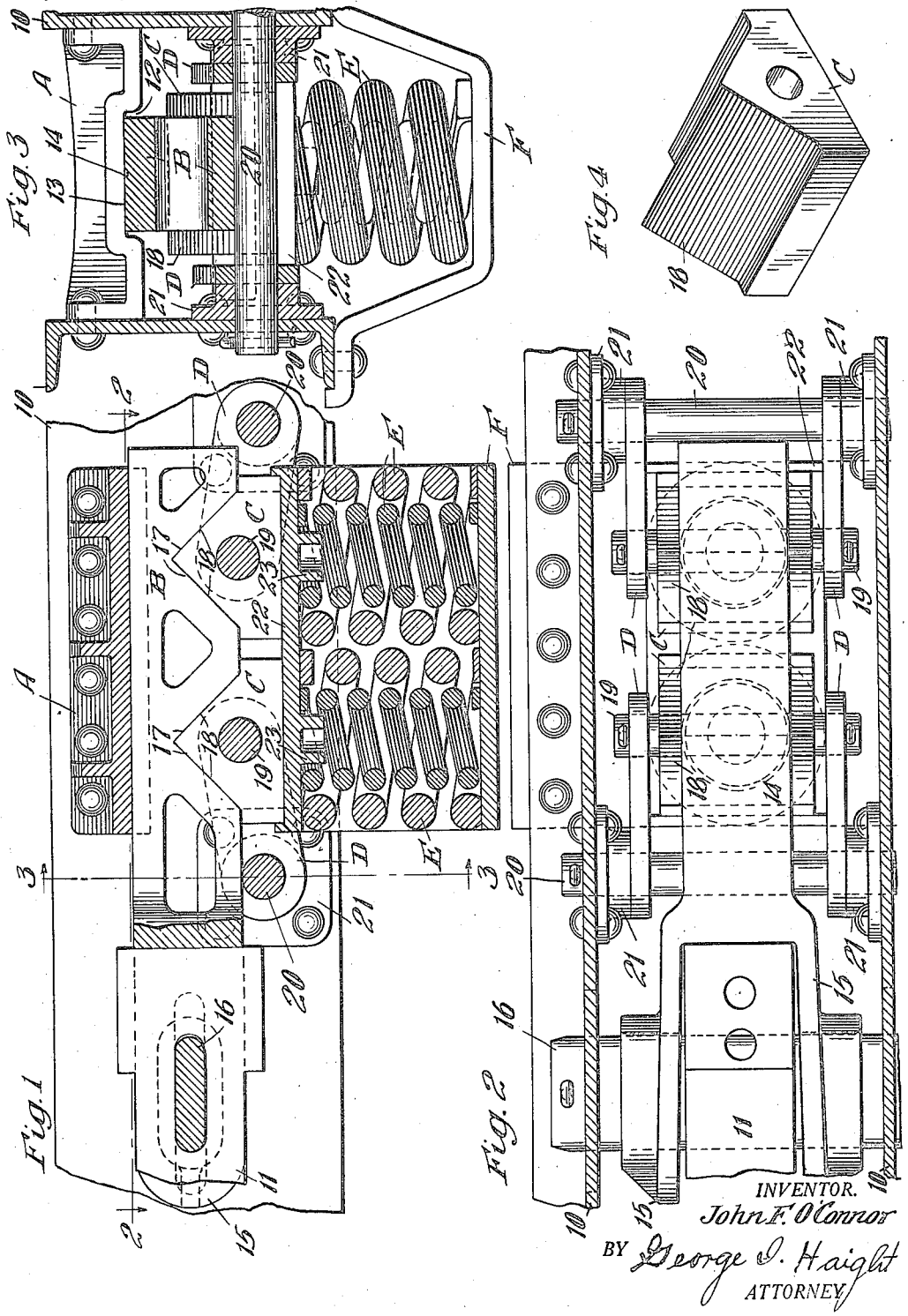
INVENTOR.
John F. O'Connor
BY George J. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,302,074.  Specification of Letters Patent.  Patented Apr. 29, 1919.

Application filed March 12, 1918. Serial No. 221,926.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanism.

Heretofore, in certain types of friction shock absorbing mechanisms, more particularly those designed for railway cars, there has been employed a thrust or pressure-bar having wedge faces with which coöperate wedge blocks that are forced in a direction at right angles to the line of movement of the thrust block and against the action of a spring. With these constructions, the pressure on the blocks tending to force the same in a direction parallel with the thrust or pressure-bar had to be absorbed by a stationary or fixed abutment which has necessitated heavy and expensive structures.

The object of my invention is to design a friction shock absorbing mechanism having a longitudinally movable pressure or thrust-bar adapted to actuate friction blocks in a direction at right angles to the movement of the bar, which friction blocks are carried by movable means designed to reduce and minimize the longitudinal strains imposed upon the means which prevent the longitudinal movement of said blocks.

In the drawing forming a part of this specification, Figure 1 is a longitudinal, vertical, sectional view of a portion of a railway draft rigging showing my improvements in connection therewith. Fig. 2 is a horizontal, sectional view, taken substantially on the line 2—2 of Fig. 1. Fig. 3 is a vertical, transverse, sectional view, taken on the line 3—3 of Fig. 1. And Fig. 4 is a detail perspective of one of the friction blocks.

In said drawing, 10—10 denote the channel-shaped center or draft sills of a railway car, and 11 the usual draw bar or coupler.

The shock absorbing mechanism proper, as shown, includes an upper fixed element A, a plunger or thrust member B, a pair of friction blocks C—C, supporting links D—D, twin springs E—E and a spring supporting-plate F.

The fixed element A is shown as extending from sill to sill and securely riveted thereto, said element A having a groove or channel section 12 with an under friction face 13 with which coöperates the top friction face 14 of the longitudinally reciprocating bar B. The bar B is shown as forked at its forward end, as indicated at 15—15, and keyed thereby to the draw bar, as by coupler-key 16. In this manner, it is evident that the plunger bar B will move in unison with the draw bar upon both buff and draft movements.

On its under face, the bar B is provided with two sets of double-acting wedge faces 17—17 and with which coöperate correspondingly formed wedge faces 18—18 on each of the blocks C. Each block C is carried on a transversely extending pin 19 having its ends mounted in a pair of the links D—D, the links in turn being pivoted at their other ends on a stationary transversely extending pin or key 20 mounted in the sills 10 and suitable bearing castings 21 secured to the inner faces of the sills. As clearly appears from Figs. 1 and 2, the front block C is carried by links D that are extended forwardly thereof and the rear block C is carried by links D which are extended rearwardly.

The blocks C rest upon an upper spring follower plate 22 having suitable bosses 23 on its under face seating within the vertical twin-arranged springs E—E. The lower ends of the springs E—E rest upon the plate F which is riveted or otherwise rigidly secured to the draft sills.

In operation, upon inward movement of the draw bar and the bar B, it is evident that the blocks C—C will be depressed against the action of the springs E—E. Instead of the blocks C—C bearing against a fixed casting, such as has heretofore been customary, and against which the blocks have had a vertical sliding movement, the blocks E in my present structure are carried by the swinging links D—D. In this manner, I eliminate or minimize the shocks heretofore encountered by the vertically moving blocks bearing against a fixed element that has had to withstand the longitudinal shocks. In draft, the same action occurs as in buff, as will be apparent.

I claim:

1. In a friction shock absorbing mechanism, the combination with a wedge member movable back and forth in one line, of a second member coöperable with the wedge member and movable in a line at right angles to the first named line, spring means resisting movement of the second named member, said spring means including a coiled spring having its axis parallel to the line of movement of said second member and in alinement therewith and adapted to be directly compressed thereby, and movable holding means by which said second named member is carried.

2. In a railway draft rigging, the combination with a bar movable longitudinally in unison with a draw bar, said bar having double-acting wedge faces on its under side, of a wedge block coöperable with said bar and disposed beneath the latter, said wedge block being movable in a vertical line, spring means below said wedge block, and movably mounted means for holding said wedge block against longitudinal movement.

3. In a railway draft rigging, the combination with a bar movable longitudinally in unison with a draw bar, said bar having double-acting wedge faces on its under side, of a wedge block coöperable with said bar and disposed beneath the latter, said wedge block being movable in a vertical line, spring means below said wedge block, and movably mounted means for holding said wedge block against longitudinal movement, said means including a pair of pivotally mounted links.

4. In a shock absorbing mechanism, the combination with a longitudinally movable thrust-bar having two sets of double-acting wedge faces thereon, of a pair of wedge blocks coöperable with said wedge faces, the blocks being movable at right angles to the movement of said bar, two pairs of pivotally mounted links, each block being pivotally carried by a pair of said links, and spring means resisting movement of said blocks.

5. In a railway draft rigging, the combination with draft sills and a draw bar, of a stationary plate extending between and secured to said sills, a thrust-bar movable in unison with the draw bar and engaging said plate on its under side, said thrust-bar having two sets of double-acting wedge faces, of a pair of blocks having wedge faces coöperable with said thrust-bar, two sets of oppositely extended pivotally mounted links by which said blocks are carried, vertical twin-arranged springs beneath said blocks, and means for supporting said springs.

In witness that I claim the foregoing I have hereunto subscribed my name this 26th day of Feb. 1918.

JOHN F. O'CONNOR.